Patented Dec. 2, 1941

2,264,434

UNITED STATES PATENT OFFICE 2,264,434

CRACKING OILS USING SYNTHETIC CATALYSTS

Gerald C. Connolly, Baton Rouge, La., assignor to Standard Oil Development Company, a corporation of Delaware No Drawing. Application December 6, 1938, Serial No. 244,178

4 Claims. (Cl. 196—52)

This invention deals with the use of superior activated synthetic gel catalysts and especially to the use of such catalysts for the catalytic cracking of hydrocarbons such as those occurring in petroleum. More particularly, this invention relates to the use of vanadium compounds for improving the catalytic cracking activity of various synthetic gel catalytic masses.

Certain metal compounds such as silica and alumina have the property of existing in the hydrogel form, which, upon drying, yields a very porous mass, (dried gel) of high catalytic activity. These hydrogels are generally prepared by allowing a hydrosol to "set" until a considerable portion of the reaction liquid is imbibed by some sort of colloidal structural arrangement. Two different hydrogels may be intimately mixed to obtain a mechanical mixture (mixed gel), which upon drying, may have superior properties over either one of the individual constituents. Plural hydrogels are obtained by allowing a mixed hydrosol of different metal compounds to "set". Impregnated gels may be prepared by soaking washed hydrogels in different salt solutions so that the latter are completely dispersed throughout the mass. Gelatinous precipitates differ from hydrogels by the fact that they separate from the liquor as a slimy fluid jelly in a separate phase leaving some supernatant liquid above. A heterogeneous gel, on the other hand, is a gelatinous precipitate dispersed in a hydrosol and allowed to "set" or "gel".

For the purposes of this invention, the term "hydrous oxide jelly" will be employed to designate all gels other than those in the dried form which no longer possess the flexible characteristics attributable to gels containing appreciable amounts of imbibed water.

For example, a hydrosol of silica may be prepared by mixing equal volumes of 25° Bé. sodium silicate solution and 23° Bé. sulfuric acid solution. In 3-5 hours, the hydrosol sets to a silica hydrogel, imbibing all of the reaction liquids. The hydrogel may be broken up, washed free of reaction salts, formed if desired and dried. Hydrous alumina hydrogel may be prepared by mixing with stirring, a solution of 10 kg. of $Al_2(SO_4)_3.18H_2O$ dissolved in 100 liters of water with 100 liters of 1 N $NH_4OH$, and washing by decantation with distilled water. A mechanical mixture of the two hydrogels is obtained by intimate mixing of the two washed hydrogels.

Plural hydrogels of silica and alumina in the ratio of 12:1 may be prepared by adding a volume of 23° Bé. sulfuric acid solution containing aluminum sulfate equivalent to one mole of $Al_2O_3$, to an equal volume of 25° Bé. sodium silicate solution. After the hydrogel has set, it is washed with distilled water.

Impregnated gels having molal ratios of about 12 $SiO_2:1Al_2O_3$ are prepared by soaking washed silica hydrogel overnight in a 30% solution of $Al(NO_3)_3.9H_2O$, draining, drying, and decomposing the aluminum nitrate by heat. These dried products of hydrogels which no longer retain their spongy characteristics are known as dried gels.

The present invention is specifically concerned with the production of dried gel catalysts containing small amounts of vanadium compounds as promoters. These compounds, added preferably in the form of their water soluble salts, may be incorporated in the hydrosol or heterogeneous gel, or employed as a mixed hydrous gel or used for impregnating hydrous or dried gels. The amount of these elements added to these catalysts is very small, preferably not over about 0.5% to 1%, since it has been found that higher amounts detrimentally affect the activity of the gel catalyst. Although silica-alumina gels are preferred as base stocks, the invention is not limited to these materials but is applicable to other hydrous oxide gels possessing some catalytic activity.

In the preferred procedure, it is desirable to employ co-impregnated silica hydrogels obtained by soaking the purified silica hydrogel produced in known manner in a mixed solution of a soluble aluminum salt such as aluminum nitrate, and a soluble salt (usually the ammonium salt or the nitrate) of the metal promoter desired. The resulting product is drained, dried, decomposed by heating, and ground or formed, if desired.

It has been found that although alumina-silica gels are fairly active catalysts for cracking reactions, their cracking activity can be appreciably improved by the addition of small amounts of vanadium compounds thereto.

The invention can be more clearly understood by reference to the following examples, which, however, are not intended to limit the invention in any respect:

*Example 1.*—A purified silica hydrogel was prepared and impregnated with aluminum nitrate so that the dried gel produced contained about 12.5% of alumina. This gel had a density of 0.600 and was employed for the cracking of West Texas gas oil of 33.8 A. P. I. gravity for a period of 2 hours at a temperature of 855° F., and a feed rate of 0.615 vol./vol./hr. The amount of gasoline obtained was 50% by volume. The liquid product had an A. P. I. gravity of 46.9 and the rejected gas obtained amounted to 11.6 liters per hundred grams of liquid product, the gas density being 0.98.

*Example 2.*—The same silica hydrogel as that described in Example 1 was impregnated with a mixture of aluminum nitrate and a vanadium salt so that the resulting dried gel contained, besides the silica, 12.5% alumina and 0.1% $V_2O_5$. The apparent density of the cataylst was 0.592. When employed for cracking under conditions such as those shown in Example 1, a gasoline yield from the same gas oil was obtained amounting to 54%, showing that the vanadium had improved the activity of the catalyst.

*Example 3.*—A catalyst was prepared as in Example 2, but the final dried gel contained 1.5% $V_2O_5$ instead of 0.1%, and the apparent density was 0.67. Cracking with this catalyst under the same conditions as those given in Example 1 resulted in a gasoline yield of only 34.5% with a concomitant rejected gas value of 24.6 liters per hundred grams of liquid product. This experiment shows that further additions of vanadium to the catalyst results in a strong inactivation effect.

*Example 4.*—This catalyst was similar to that shown by Example 2, except that the $V_2O_5$ content was 5% and the apparent density of the catalyst was 0.638. Cracking with this catalyst resulted in a gasoline yield of merely 23.5, with a rejected gas formation of 31.4 liters per hundred grams of liquid product, showing that still further additions of vanadium caused rapid deterioration of the catalyst mass.

Although these catalysts operate most satisfactorily when employed for cracking reactions, especially in the cracking of petroleum hydrocarbons, they may be advantageously employed for catalyzing other reactions such as dehydrogenation, alkylation, isomerization, aromatization, polymerization and the like.

Various modifications may be made within the scope of the present disclosure, and the invention is not limited to any particular examples or theory of operation, but only by the following claims in which it is intended to cover the invention as broadly as the prior art permits.

I claim:

1. A method of cracking hydrocarbon oils which comprises contacting said oils with an adsorbent siliceous catalyst containing alumina and a fraction of a per cent of vanadium oxide in a cracking zone, the amount of said vanadium oxide being only sufficient to improve the cracking activity of the catalyst, maintaining said cracking zone at active cracking temperature and keeping said oil within said cracking zone for a period sufficient to obtain the desired cracking thereof.

2. A method of cracking hydrocarbon oils which comprises contacting said oils with a silica-alumina gel containing a fraction of a per cent of vanadium-oxide in a cracking zone, the amount of said vanadium oxide being only sufficient to improve the cracking activity of the catalyst, maintaining said oil within said cracking zone at active cracking temperature and for a period sufficient to obtain the desired cracking thereof.

3. A method of cracking hydrocarbon oils which comprises contacting said oil with an adsorbent siliceous catalyst containing aluminum and vanadium oxide in a cracking zone, the amount of said vanadium oxide being of the order of 0.1%, maintaining said oil within said cracking zone at active cracking temperature for a period sufficient to obtain the desired cracking thereof.

4. A method of cracking hydrocarbon oils which comprises contacting said oils with a silica gel containing aluminum and vanadium oxide formed by impregnating a hydrous oxide of silicon with decomposable salts of aluminum and vanadium in a cracking zone and thereafter converting the hydrous oxide into a dry silica gel and decomposing the salts into the oxides and maintaining said oil within said cracking zone at a cracking temperature and for a period sufficient to obtain the desired cracking thereof.

GERALD C. CONNOLLY.